(12) United States Patent
Sun

(10) Patent No.: US 12,212,882 B2
(45) Date of Patent: Jan. 28, 2025

(54) VIDEO FRAME INTERPOLATION PROCESSING METHOD, VIDEO FRAME INTERPOLATION PROCESSING APPARATUS AND READABLE STORAGE MEDIUM

(71) Applicant: BOE Technology Group Co., Ltd., Beijing (CN)

(72) Inventor: Mengdi Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,236

(22) PCT Filed: Feb. 25, 2022

(86) PCT No.: PCT/CN2022/077919
§ 371 (c)(1),
(2) Date: Feb. 20, 2023

(87) PCT Pub. No.: WO2023/159470
PCT Pub. Date: Aug. 31, 2023

(65) Prior Publication Data
US 2024/0275909 A1    Aug. 15, 2024

(51) Int. Cl.
*H04N 5/268*    (2006.01)
*H04N 5/278*    (2006.01)
*H04N 7/01*    (2006.01)

(52) U.S. Cl.
CPC .......... *H04N 5/268* (2013.01); *H04N 5/278* (2013.01); *H04N 7/0135* (2013.01)

(58) Field of Classification Search
CPC ...... H04N 5/268; H04N 5/278; H04N 7/0135; H04N 21/4402; H04N 21/488
See application file for complete search history.

(56) References Cited

U.S. PATENT DOCUMENTS

| | | | |
|---|---|---|---|
| 2015/0138373 A1* | 5/2015 | Garcia | H04N 19/154 |
| | | | 348/192 |
| 2016/0301881 A1* | 10/2016 | Taggart | H04N 5/144 |
| 2017/0064325 A1 | 3/2017 | Lim et al. | |

FOREIGN PATENT DOCUMENTS

| | | |
|---|---|---|
| CN | 110708568 A | 1/2020 |
| CN | 112584196 A | 3/2021 |
| CN | 112584232 A | 3/2021 |
| CN | 108600773 B | 8/2021 |
| CN | 113271494 A | 8/2021 |

* cited by examiner

Primary Examiner — Michael E Teitelbaum
(74) Attorney, Agent, or Firm — Banner & Witcoff, Ltd.

(57) ABSTRACT

A video frame interpolation processing method and apparatus thereof, and a non-transitory readable storage medium are disclosed. The method includes: acquiring a target video; acquiring a first frame number set, based on the target video; acquiring at least one speech fragment of a target audio; acquiring a second frame number set, based on the at least one speech fragment of the target audio and the target video; performing frame interpolation on the target video, based on the first frame number set and the second frame number set. The method can avoid the deformation problem caused by picture switch in frame interpolation processing.

20 Claims, 7 Drawing Sheets

VIDEO FRAME INTERPOLATION PROCESSING METHOD, VIDEO FRAME INTERPOLATION PROCESSING APPARATUS AND READABLE STORAGE MEDIUM

The application is a U.S. National Phase Entry of International Application No. PCT/CN2022/077919 filed on Feb. 25, 2022, designating the United States of America. The present application claims priority to and the benefit of the above-identified application and the above-identified application is incorporated by reference herein in its entirety.

TECHNICAL FIELD

Embodiments of the present disclosure relate to a video frame interpolation processing method, a video frame interpolation processing apparatus and a non-transitory readable storage medium.

BACKGROUND

Video processing is typical application of artificial intelligence; and a video frame interpolation technology is also a typical technology in video processing, which aims to synthesize an intermediate video frame with smooth transition according to forward and backward video frames in a video, so as to make the video play more smoothly and improve viewing experience of users. For example, a video having 24 frames per second may be converted to a video having 48 frames per second through video frame interpolation processing, so that users may feel the video clearer and smoother when watching.

SUMMARY

At least one embodiment of the present disclose provides a video frame interpolation processing method, comprising: acquiring a target video, wherein the target video comprises a plurality of video frames, each of the plurality of video frames has a corresponding frame number, and frame numbers of the plurality of video frames increase progressively in time order; acquiring a first frame number set, based on the target video, wherein the first frame number set comprises at least one first frame number, and each of the at least one first frame number corresponds to a video frame with picture switch; acquiring at least one speech fragment of a target audio, wherein the target audio corresponds to the target video in time domain; acquiring a second frame number set, based on the at least one speech fragment of the target audio and the target video, wherein the second frame number set comprises at least one second frame number, and each of the at least one second frame number corresponds to a video frame with subtitle switch; and performing frame interpolation on the target video, based on the first frame number set and the second frame number set.

For example, in the method provided by at least one embodiment of the present disclose, the picture switch comprises the subtitle switch and/or scene switch.

For example, in the method provided by at least one embodiment of the present disclose, the acquiring a first frame number set based on the target video, comprises: acquiring a first video frame and a second video frame of the target video, wherein the first video frame and the second video frame are adjacent in time domain, and the first video frame is a forward frame of the second video frame; acquiring a comparison result between the first video frame and the second video frame, based on the first video frame and the second video frame, wherein the comparison result indicates whether the picture switch is present between the first video frame and the second video frame; and determining whether to put a frame number of the first video frame into the first frame number set based on the comparison result.

For example, in the method provided by at least one embodiment of the present disclose, the acquiring a comparison result between the first video frame and the second video frame based on the first video frame and the second video frame, comprises: determining whether the subtitle switch is present between the first video frame and the second video frame, based on whether a subtitle image of the first video frame and a subtitle image of the second video frame are identical.

For example, in the method provided by at least one embodiment of the present disclose, the determining whether the subtitle switch is present between the first video frame and the second video frame based on whether a subtitle image of the first video frame and a subtitle image of the second video frame are identical, comprises: acquiring a first sub-image of the first video frame, wherein the first sub-image corresponds to a subtitle region of the first video frame; acquiring a second sub-image of the second video frame, wherein the second sub-image corresponds to a subtitle region of the second video frame; and determining whether the subtitle switch is present between the first video frame and the second video frame, based on the first sub-image and the second sub-image.

For example, in the method provided by at least one embodiment of the present disclose, the determining whether the subtitle switch is present between the first video frame and the second video frame, based on the first sub-image and the second sub-image, comprises: performing subtraction between the first sub-image and the second sub-image to obtain a binary image; determining that the subtitle switch is present between the first video frame and the second video frame, in response to a count of first pixels in the binary image being greater than a first threshold, wherein a value of a first pixel is greater than a second threshold; and determining that the subtitle switch is not present between the first video frame and the second video frame, in response to the count of the first pixels being not greater than the first threshold.

For example, in the method provided by at least one embodiment of the present disclose, the acquiring a comparison result between the first video frame and the second video frame, based on the first video frame and the second video frame, comprises: determining whether the scene switch is present between the first video frame and the second video frame, based on whether a scene of the first video frame and a scene of the second video frame are identical.

For example, in the method provided by at least one embodiment of the present disclose, the determining whether the scene switch is present between the first video frame and the second video frame, based on whether a scene of the first video frame and a scene of the second video frame are identical, comprises: acquiring a similarity between the first video frame and the second video frame; determining that the scene switch is not present between the first video frame and the second video frame, in response to the similarity being greater than a third threshold; and determining that the scene switch is present between the first video frame and the second video frame, in response to the similarity being not greater than the third threshold.

For example, in the method provided by at least one embodiment of the present disclose, the determining whether to put a frame number of the first video frame into the first frame number set based on the comparison result, comprises: determining to put the frame number of the first video frame into the first frame number set, in response to the comparison result indicating that the picture switch is present between the first video frame and the second video frame; and determining not to put the frame number of the first video frame into the first frame number set, in response to the comparison result indicating that the picture switch is not present between the first video frame and the second video frame.

For example, in the method provided by at least one embodiment of the present disclose, the acquiring a first frame number set based on the target video, comprises: deleting duplicate first frame numbers in the first frame number set.

For example, in the method provided by at least one embodiment of the present disclose, the acquiring a second frame number set, based on the at least one speech fragment of the target audio and the target video, comprises: acquiring a start moment and an end moment of each speech fragment in the at least one speech fragment, based on the at least one speech fragment of the target audio; acquiring a start video frame corresponding to the start moment and an end video frame corresponding to the end moment in the target video, based on the start moment and the end moment of each speech fragment in the at least one speech fragment, and the target video; and putting a frame number corresponding to the start video frame and a frame number corresponding to the end video frame into the second frame number set.

For example, in the method provided by at least one embodiment of the present disclose, the acquiring a second frame number set, based on the at least one speech fragment of the target audio and the target video, comprises: merging two adjacent second frame numbers in the second frame number set into one second frame number, wherein the one second frame number is a second frame number with a smaller value in the two adjacent second frame numbers.

For example, in the method provided by at least one embodiment of the present disclose, the acquiring at least one speech fragment of a target audio, comprises: acquiring the target audio; and performing speech recognition on the target audio, to obtain the at least one speech fragment of the target audio.

For example, in the method provided by at least one embodiment of the present disclose, the performing frame interpolation on the target video, based on the first frame number set and the second frame number set, comprises: performing no frame interpolation on a current video frame, in response to a frame number of the current video frame to undergo frame interpolation currently being in the first frame number set or the second frame number set; and performing frame interpolation on the current video frame, in response to the frame number of the current video frame being not in the first frame number set or the second frame number set.

For example, in the method provided by at least one embodiment of the present disclose, the performing frame interpolation on the current video frame, in response to the frame number of the current video frame being not in the first frame number set or the second frame number set, comprises: interpolating one video frame for the current video frame, in response to a frame number of a previous frame of the current video frame being not in the first frame number set or the second frame number set.

For example, in the method provided by at least one embodiment of the present disclose, the performing frame interpolation on the current video frame, in response to the frame number of the current video frame being not in the first frame number set or the second frame number set, comprises: interpolating two video frames for the current video frame, in response to a frame number of a previous frame of the current video frame being in the first frame number set or the second frame number set, and the frame number of the previous frame has no adjacent frame number in the first frame number set or the second frame number set; and interpolating three video frames for the current video frame, in response to the frame number of the previous frame of the current video frame being in the first frame number set or the second frame number set, and the frame number of the previous frame has an adjacent frame number in the first frame number set or the second frame number set.

For example, the method provided by at least one embodiment of the present disclose further comprises: acquiring audio-and-video combination data, wherein the audio-and-video combination data is used to acquire the target video and the target audio from the audio-and-video combination data.

At least one embodiment of the present disclose provides a video frame interpolation processing apparatus, comprises: a video acquiring module, configured to acquire a target video, wherein the target video comprises a plurality of video frames, each of the plurality of video frames has a corresponding frame number, and frame numbers of the plurality of video frames increase progressively in time order; a first frame number acquiring module, configured to acquire a first frame number set based on the target video, wherein the first frame number set comprises at least one first frame number, and each of the at least one first frame number corresponds to a video frame with picture switch; an audio acquiring module, configured to acquire at least one speech fragment of the target audio, wherein the target audio corresponds to the target video in time domain; a second frame number acquiring module, configured to acquire a second frame number set, based on the at least one speech fragment of the target audio and the target video, wherein the second frame number set comprises at least one second frame number, and each of the at least one second frame number corresponds to a video frame with subtitle switch; and a frame interpolating module, configured to perform frame interpolation on the target video, based on the first frame number set and the second frame number set.

At least one embodiment of the present disclose provides a video frame interpolation processing apparatus, comprises: a processor; a memory, comprising one or more computer program modules; wherein the one or more computer program modules are stored in the memory and configured to be executed by the processor, and the one or more computer program modules comprise instructions for executing the video frame interpolation processing method in any of the above embodiments.

At least one embodiment of the present disclose provides a non-transitory readable storage medium, having computer instructions stored thereon, wherein when executed by a processor, the computer instructions execute the video frame interpolation processing method in any of the above embodiments.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make the purpose, technical scheme and advantages of the embodiment of the present disclosure more clear, the technical scheme of the embodiment of the present disclosure will be described clearly and completely with the attached drawings. Obviously, the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Flowcharts are used in this disclosure to explain the operations performed by the system according to the embodiment of the present application. It should be understood that the preceding or following operations are not necessarily performed accurately in order. On the contrary, various steps can be processed in reverse order or at the same time, as needed. At the same time, other operations can be added to these processes, or one or more steps can be removed from these processes.

Unless otherwise defined, technical terms or scientific terms used in this disclosure shall have their ordinary meanings as understood by people with ordinary skills in the field to which this disclosure belongs. The terms "first", "second" and the like used in this disclosure do not indicate any order, quantity or importance, but are only used to distinguish different components. Similarly, similar words such as "a", "an" or "the" do not indicate a quantity limit, but indicate the existence of at least one. Similar words such as "include" or "comprise" mean that the elements or objects appearing before the word cover the elements or objects listed after the word and their equivalents, without excluding other elements or objects. Similar words such as "connected" or "connecting" are not limited to physical or mechanical connection, but can include electrical connection, whether direct or indirect. "up", "down", "left" and "right" are only used to indicate the relative positional relationship. When the absolute position of the described object changes, the relative positional relationship may also change accordingly.

Figure 1:
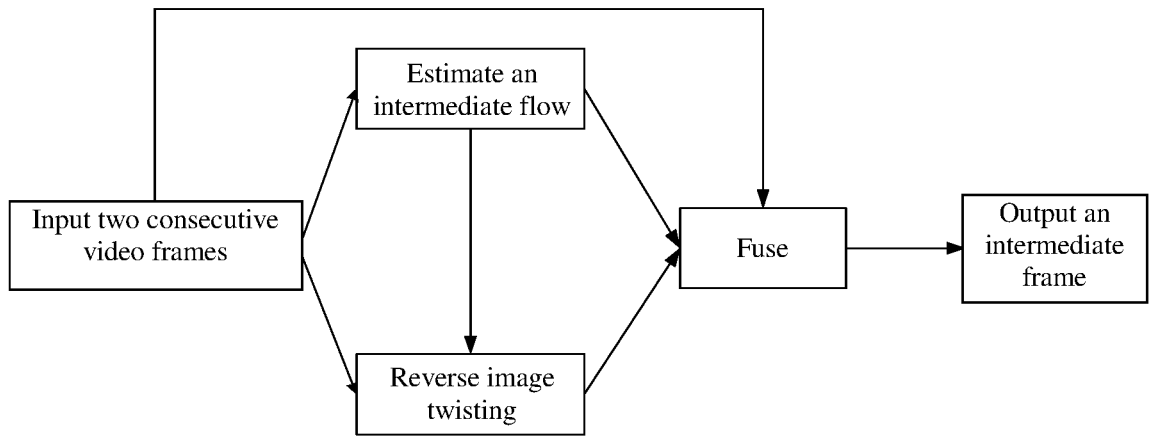
FIG. 1 is a schematic block diagram of a video frame interpolation method provided by at least one embodiment of the present disclosure.

FIG. 1 is a schematic diagram of a video frame interpolation method provided by at least one embodiment of the present disclosure.

As shown in FIG. 1, the video frame interpolation method is usually synthesizing an intermediate frame between two consecutive frames of a video, for improving a frame rate and enhancing visual quality. The video frame interpolation method may support various applications, for example, slow motion generation, video compression and training data generation for video motion deblurring. For example, given input frames $I_0$ and $I_1$, a purpose of the video frame interpolation method is to generate an intermediate frames $I_1$, t→(0, 1). For example, as shown in FIG. 1, intermediate flow information is estimated for two consecutive input frames through a network, a rough result is obtained by reverse twisting the input frames, and the result, together with the input frames and the intermediate flow information, is input into a fusion network, to finally obtain the intermediate frame.

At present, a commonly used video frame interpolation algorithm cannot handle a deformation problem well, for example, the deformation problem caused by scene switch, subtitle switch, etc. of the video. Most video frame interpolation algorithms need to use information of forward and backward frames of the video, so when subtitles/scenes of the forward and backward frames of the video are switched, optical flow information of the forward and backward frames may not be estimated correctly, so obvious deformation will occur. Subtitle switch may refer to change of subtitle content or great movement of subtitle background. When the subtitle background of the video moves greatly, the subtitle may be deformed.

At least to overcome the above-described technical problems, at least one embodiment of the present disclosure provides a video frame interpolation processing method; the method includes: acquiring a target video; acquiring a target video; acquiring a first frame number set, based on the target video; acquiring at least one speech fragment of a target audio; acquiring a second frame number set, based on the at least one speech fragment of the target audio and the target video; performing frame interpolation on the target video, based on the first frame number set and the second frame number set. the target video includes a plurality of video frames, each of the plurality of video frames has a corresponding frame number, and frame numbers of the plurality of video frames increase progressively in time order. The first frame number set includes at least one first frame number, and each of the at least one first frame number corresponds to a video frame with picture switch. The target audio corresponds to the target video in time domain. The second frame number set includes at least one second frame number, and each of the at least one second frame number corresponds to a video frame with subtitle switch, so as to avoid the deformation problem caused by picture switch in frame interpolation processing.

Accordingly, at least one embodiment of the present disclosure further provides a video frame interpolation processing apparatus corresponding to the above-described video frame interpolation processing method and a non-transitory readable storage medium.

The video frame interpolation processing method provided by at least one embodiment of the present disclosure may solve the problem of obvious deformation caused by video picture switch (e.g., scene switch, subtitle switch, etc.) during frame interpolation processing, ensure smoothness of the video, and thus improving viewing experience of users.

Hereinafter, non-limitative illustration will be given for a layout design method provided by at least one embodiment of the present disclosure through several examples or embodiments; as described below; different features in these specific examples or embodiments may be combined with each other in the case of no conflict, so as to obtain new examples or embodiments, which also belong to the scope of protection of the present disclosure.

Figure 2:
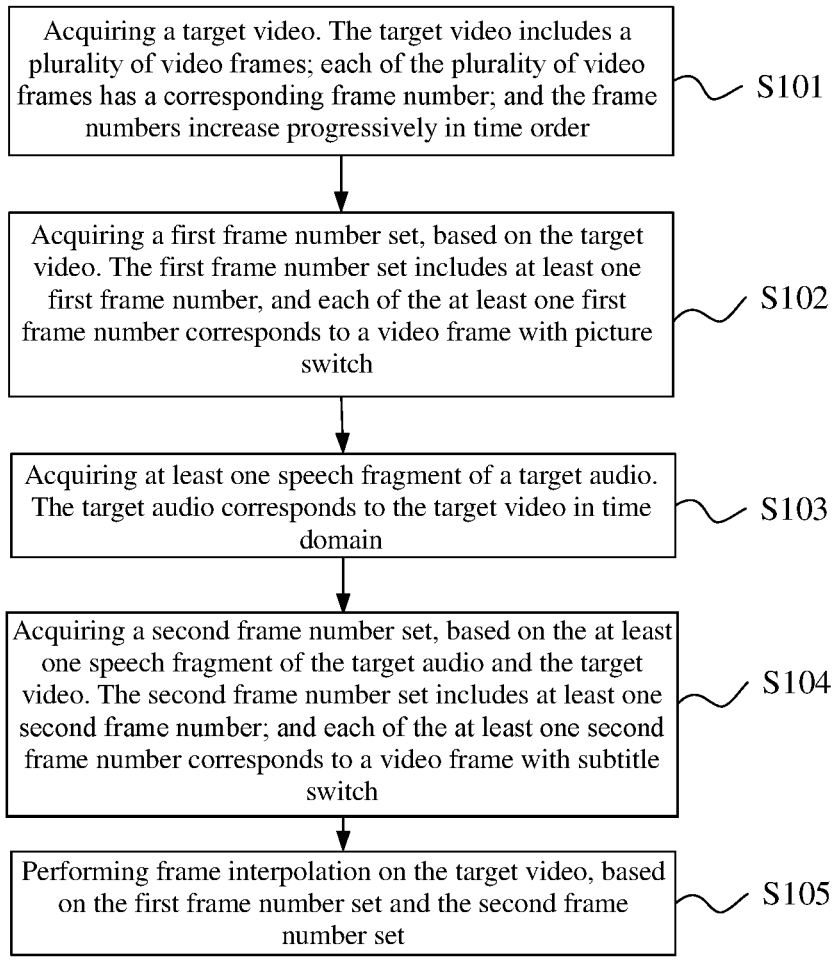
FIG. 2 is a schematic flow chart of a video frame interpolation processing method provided by at least one embodiment of the present disclosure.

FIG. 2 is a schematic flow chart of a video frame interpolation processing method provided by at least one embodiment of the present disclosure.

At least one embodiment of the present disclosure provides a video frame interpolation processing method 10, as shown in FIG. 2. For example, the video frame interpolation processing method 10 may be applied to any scene requiring video frame interpolation, for example, the method may be applied to various video products and services such as TV dramas, movies, documentaries, advertisements, MVs, etc., or may also be applied to other aspects, which will not be limited in the embodiments of the present disclosure. As shown in FIG. 2, the video frame interpolation processing method 10 may include steps S101 to S105 below.

Step S101: acquiring a target video. The target video includes a plurality of video frames; each of the plurality of video frames has a corresponding frame number; and the frame numbers increase progressively in time order.

Step S102: acquiring a first frame number set, based on the target video. The first frame number set includes at least one first frame number; and each of the at least one first frame number corresponds to a video frame with picture switch.

Step S103: acquiring at least one speech fragment of a target audio. The target audio corresponds to the target video in time domain.

Step S104: acquiring a second frame number set, based on the at least one speech fragment of the target audio and the target video. The second frame number set includes at least one second frame number; and each of the at least one second frame number corresponds to a video frame with subtitle switch.

Step S105: performing frame interpolation on the target video, based on the first frame number set and the second frame number set.

For example, with respect to step S101, according to at least one embodiment of the present disclosure, the target video may be any video or video frame sequence to undergo frame interpolation. For example, in time order, the video may include video frame 1, video frame 2, video frame 3, video frame 4, video frame 5 . . . wherein, the number 1 is a frame number of video frame 1, the number 2 is a frame number of video frame 2, the number 3 is a frame number of video frame 3, and so on. For example, with respect to two frames adjacent in time domain, for example, video frame 1 and video frame 2, video frame 1 is a forward frame of video frame 2, and video frame 2 is a backward frame of video frame 1.

For example, with respect to step S102, according to at least one embodiment of the present disclosure, it is assumed that the first frame number set includes frame number 1, which indicates that there is picture switch in video frame 1. It should be noted that according to the embodiment of the present disclosure, it is illustrated by taking a forward frame of two adjacent frames as a reference. When picture switch occurs between two adjacent frames (e.g., change in subtitle content, great movement of subtitle background, change in scene, etc.), the frame number of the forward frame is recorded. For example, presence of picture switch in video frame 1 refers to that there is picture switch between video frame 1 and video frame 2. For another example, frame interpolation on video frame 1 refers to frame interpolation between video frame 1 and video frame 2. Of course, a backward frame of two adjacent frames may also be taken as a reference, as long as it is kept consistent in the whole video frame interpolation processing method.

It should be noted that according to the embodiment of the present disclosure, the "first frame number set" and the "second frame number set" are used to refer to a set of frame numbers corresponding to at least one video frame in the video or the video frame sequence. Both the "first frame number set" and the "second frame number set" are neither limited to a specific frame number set, nor to a specific order.

It should also be noted that the "first frame number" and the "second frame number" are respectively used to refer to the frame numbers in the first frame number set and the second frame number set. Both the "first frame number" and the "second frame number" are neither limited to a specific frame number, nor to a specific order.

For example, according to at least one embodiment of the present disclosure, with respect to step S103, the target audio corresponding to the target video in time domain may be understood as that the target audio and the target video are for a same object. For example, in one example, the target audio and the target video are simultaneously captured and recorded when capturing the same object. For another example, in another example, the target video is video data of one movie, and the target audio is audio data of the same movie. Specific content of the target video and the target audio will not be limited in the embodiments of the present disclosure.

For example, according to at least one embodiment of the present disclosure, with respect to step S104, it is assumed that the second frame number set includes frame number 3, which indicates that there is subtitle switch for video frame 3, that is, there is subtitle switch between video frame 3 and video frame 4.

For example, according to at least one embodiment of the present disclosure, with respect to step S105, because the frame numbers in both the first frame number set and the second frame number set indicate that there is picture switch for a corresponding video frame, a frame interpolation operation may be performed on the target video based on the first frame number set and the second frame number set, and frame interpolation may be performed selectively on some video frames in the target video, so as to avoid the deformation problem caused by picture switch between the forward and backward frames of the video.

It should be noted that the frame interpolation operation will not be specifically limited in the embodiments of the present disclosure; an intermediate frame may be generated based on two adjacent video frames, the intermediate frame may be generated based on more adjacent frames, and the intermediate frame may be generated by copying a certain frame, which may be set according to actual needs.

Therefore, in the video frame interpolation processing method 10 provided by at least one embodiment of the present disclosure, the frame interpolation operation is selectively executed according to the first frame number set and the second frame number set, so as to effectively avoid the problem of obvious deformation caused by video picture switch during frame interpolation processing, ensure smoothness of the video, and thus improving viewing experience of users.

For example, according to at least one embodiment of the present disclosure, picture switch occurring between forward and backward video frames of the video may include subtitle switch, or may also include scene switch, etc., which will not be limited in the embodiments of the present disclosure. For example, according to at least one embodiment of the present disclosure, subtitle switch may include switch of subtitle content, great movement of subtitle background, etc., which will not be limited in the embodiments of the present disclosure.

Figure 3:
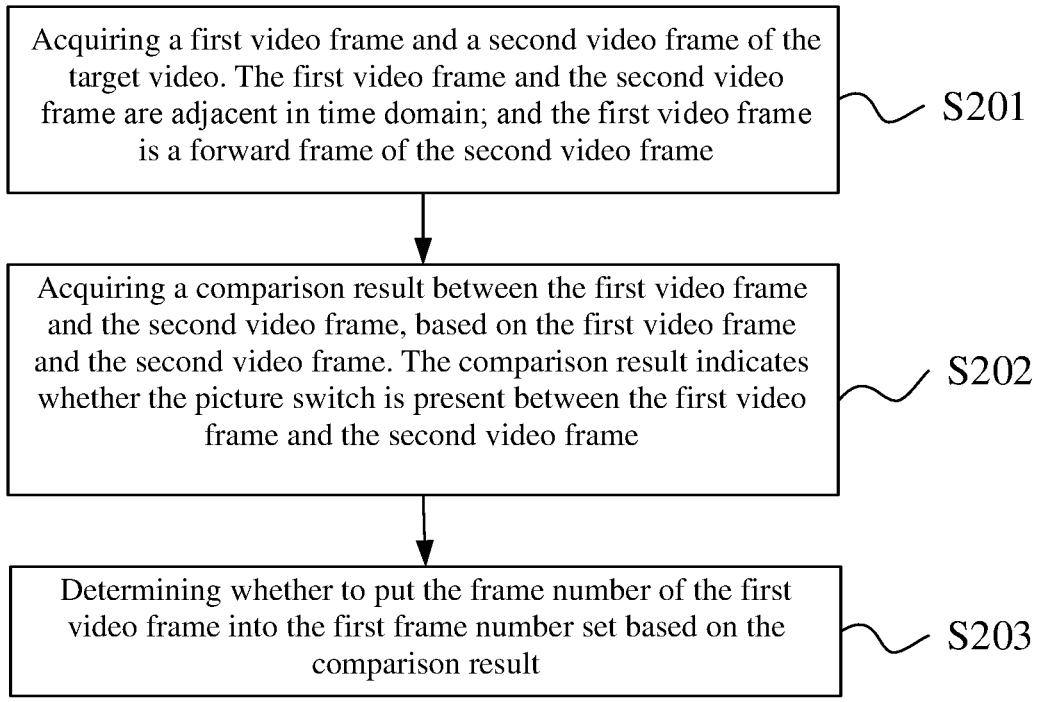
FIG. 3 is an operation flow chart corresponding to step S102 provided by at least one embodiment of the present disclosure.

FIG. 3 is an operation flow chart corresponding to step S102 provided by at least one embodiment of the present disclosure.

For example, according to at least one embodiment of the present disclosure, with respect to step S102, the acquiring a first frame number set based on the target video may include steps S201 to S203 below, as shown in FIG. 3.

Step S201: acquiring a first video frame and a second video frame of the target video. The first video frame and the second video frame are adjacent in time domain; and the first video frame is a forward frame of the second video frame.

Step S202: acquiring a comparison result between the first video frame and the second video frame, based on the first video frame and the second video frame. The comparison result indicates whether a picture switch is present between the first video frame and the second video frame.

Step S203: determining whether to put the frame number of the first video frame into the first frame number set based on the comparison result.

It should be noted that according to the embodiment of the present disclosure, the "first video frame" and the "second video frame" are used to refer to any two temporally consecutive or adjacent frames of image or video frames in the video or the video frame sequence. The "first video frame" is used to refer to a previous frame of image of two temporally adjacent frames, and the "second video frame" is used to refer to a next frame of image of two temporally adjacent frames. Both the "first video frame" and the "second video frame" are neither limited to a specific frame of image, nor to a specific order.

For example, according to at least one embodiment of the present disclosure, the video frame 2 and the video frame 3 are two adjacent video frames in the video frame sequence in time domain; comparing the video frame 2 and the video frame 3, if a picture switch is present between the video frame 2 and the video frame 3, the frame number "2" of the forward frame (i.e. video frame 2) is put into the second frame number set.

For example, according to at least one embodiment of the present disclosure, with respect to step S202, the acquiring a comparison result between the first video frame and the second video frame, based on the first video frame and the second video frame, may include: determining whether a subtitle switch is present between the first video frame and the second video frame, based on whether subtitle images of the first video frame and the second video frame are identical.

It should be noted that the subtitle image refers to an image of a region where the subtitle is located in the video frame. Because a display position of the subtitle in the video frame is usually fixed, an approximate region where the subtitle is located may be set in advance. Of course, the region where the subtitle is located may also be positioned by using a text recognition method, which will not be limited in the embodiments of the present disclosure.

Figure 4:
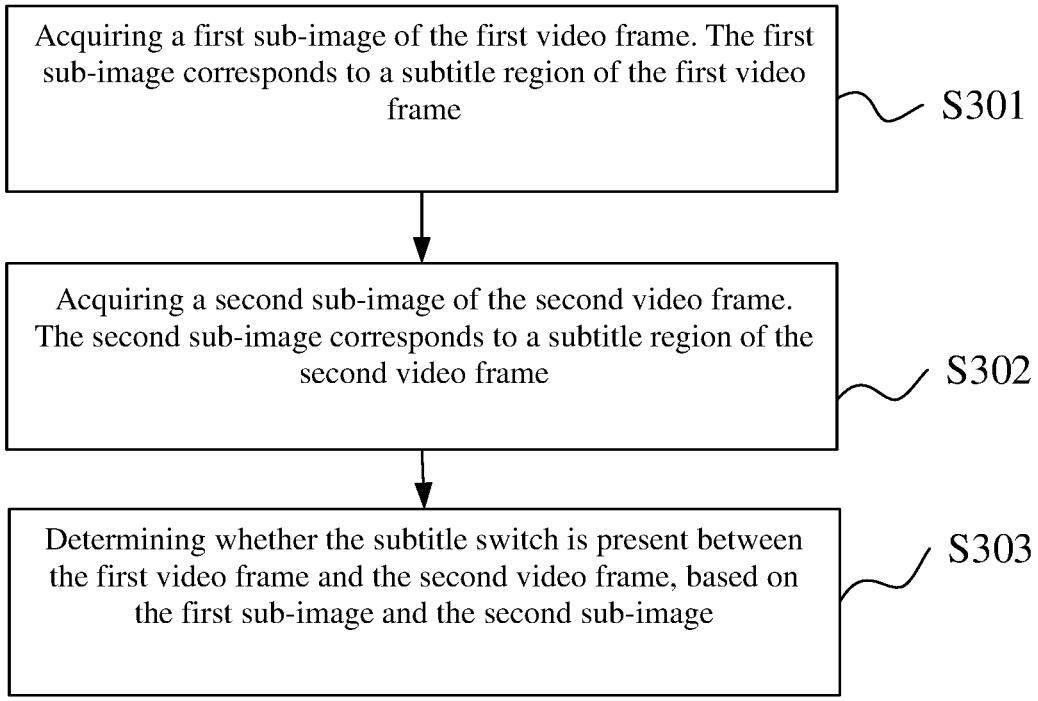
FIG. 4 is an operation flow chart of judging subtitle switch provided by at least one embodiment of the present disclosure.

FIG. 4 is an operation flow chart of judging subtitle switch provided by at least one embodiment of the present disclosure.

For example, according to at least one embodiment of the present disclosure, the determining whether a subtitle switch is present between the first video frame and the second video frame, based on whether subtitle images of the first video frame and the second video frame are identical, may include steps S301 to S303 below, as shown in FIG. 4. Step S301: acquiring a first sub-image of the first video frame. The first sub-image corresponds to a subtitle region of the first video frame.

Step S302: acquiring a second sub-image of the second video frame. The second sub-image corresponds to a subtitle region of the second video frame.

Step S303: determining whether a subtitle switch is present between the first video frame and the second video frame, based on the first sub-image and the second sub-image.

It should be noted that according to the embodiment of the present disclosure, the "first sub-image" and the "second sub-image" are each used to refer to an image of a region where the subtitle is located in the corresponding video frame. The "first sub-image" and the "second sub-image" are neither limited to a specific image, nor to a specific order.

For example, according to at least one embodiment of the present disclosure, an approximate position of the subtitle region in the video frame may be set in advance, so as to acquire a sub-image corresponding to the subtitle region of the corresponding video frame.

For another example, with respect to at least one embodiment of the present disclosure, coordinates of a subtitle in the video frame (e.g., coordinates of top left, bottom left, top right, and bottom right vertex positions of a complete subtitle) may be recognized by executing a text recognition operation on the video frame. Based on the coordinates, the region where the subtitle is located in the video frame may be obtained, so as to obtain a sub-image corresponding to the subtitle region of the video frame, which will not be limited in the embodiments of the present disclosure, and may be set according to actual needs.

For example, according to at least one embodiment of the present disclosure, with respect to step S303, the determining whether a subtitle switch is present between the first video frame and the second video frame, based on the first sub-image and the second sub-image, may include: performing subtraction between the first sub-image and the second sub-image to obtain a binary image; determining that a subtitle switch is present between the first video frame and the second video frame, in response to the number of first pixels in the binary image being greater than a first threshold; and determining that the subtitle switch is not present between the first video frame and the second video frame, in response to the number of first pixels being not greater than the first threshold. A value of the first pixel is greater than a second threshold.

For example, according to at least one embodiment of the present disclosure, a frame differencing method may be used to determine whether a subtitle switch is present between the first video frame and the second video frame. For example, subtracting the corresponding pixel values of two adjacent frames of images to obtain a difference image, and then binarizing the difference image to obtain a binary image. That is to say, the difference image may be obtained by performing subtraction between corresponding pixel values of the subtitle image (i.e., the first sub-image) of the first video frame and the subtitle image (i.e., the second sub-image) of the second video frame, and then the difference image is binarized to obtain a binary image. For example, in some examples, when an absolute value of the difference value by performing subtraction on the pixels is greater than a certain threshold, 255 is output (i.e., white is displayed), and when an absolute value of the difference value by performing subtraction on the pixels is not greater than a certain threshold, 0 is output (i.e., black is displayed), so as to obtain a binary image (i.e., a black and white image). Through the binary image, it may be determined which region between the first sub-image and the second sub-image has movements. Then, it may be determined whether a subtitle switch occurs according to the number of some pixels in the binary image. For example, in some examples, it may be determined whether subtitle switch occurs between the first sub-image and the second sub-image according to whether the number of white pixels (i.e., pixels with a pixel value equal to 255) is greater than a certain threshold (i.e., the first threshold). For example, if an area of a white portion in the binary image exceeds half of the whole image, it may be considered that subtitle switch occurs between the first sub-image and the second sub-image. For example, in other examples, it may be determined whether subtitle switch occurs between the first sub-image and the second sub-image according to the number of pixels whose pixel value is greater than a certain threshold (i.e., the second threshold) in the binary image.

For example, according to the embodiment of the present disclosure, subtitle switch may be change of subtitle content. For example, in one example, a subtitle in the first video frame is "Where are you going", and a subtitle in the second video frame is "I'm going to school". If subtitle content in the first video frame is different from subtitle content in the second video frame, it may be considered that subtitle switch has occurred between the first video frame and the second video frame.

For another example, according to the embodiment of the present disclosure, subtitle switch may be great movement of the subtitle background. For example, in one example, subtitle content of two adjacent frames does not change, but background of the subtitle changes more greatly. Such a situation will have an impact on frame interpolation, which may lead to deformation of the subtitle undergone frame interpolation.

It should be noted that values of the "first threshold", the "second threshold" and the "third threshold" will not be limited in the embodiments of the present disclosure, and may be set according to actual needs. The "first threshold", the "second threshold", and the "third threshold" are neither limited to certain specific values, nor to a specific order.

Therefore, through the above-described operation of comparing the first sub-image with the second sub-image, it may be determined whether subtitle switch has occurred between the first video frame and the second video frame.

For example, according to at least one embodiment of the present disclosure, picture switch may include scene switch in addition to subtitle switch. With respect to step S202, the acquiring a comparison result between the first video frame and the second video frame, based on the first video frame and the second video frame, may include: determining whether a scene switch is present between the first video frame and the second video frame, based on whether the scenes of the first video frame and the second video frame are identical.

For example, in one example, a scene in the first video frame is in a shopping mall, and a scene in the second video frame is in a school; the scene in the first video frame is different from the scene in the second video frame, and then it may be considered that scene switch has occurred between the first video frame and the second video frame. It should be noted that according to the embodiment of the present disclosure, scenes in the respective video frames may include arbitrary scenes such as shopping malls, schools, scenic spots, etc., will not be limited in the embodiments of the present disclosure.

For example, according to at least one embodiment of the present disclosure, when the video involves scene switch, image similarity of two video frames, i.e., the forward and backward video frames, will be significantly reduced. Therefore, scene segmentation may be implemented by calculating image similarity.

For example, according to at least one embodiment of the present disclosure, the determining whether scene switch occurs between two adjacent video frames, may include operations below: acquiring similarity between the first video frame and the second video frame; determining that scene switch is not present between the first video frame and the second video frame, in response to the similarity being greater than the third threshold; and determining that a scene switch is present between the first video frame and the second video frame, in response to the similarity being not greater than the third threshold.

For example, according to the embodiment of the present disclosure, similarity between two adjacent video frames may be calculated by using various methods, for example, a Structural Similarity (SSIM) algorithm, a cosine similarity algorithm, a histogram algorithm, a perceptual hash algorithm, a mutual information based algorithm, etc. The method of calculating image similarity will not be limited in the embodiment of the present disclosure, and may be selected according to actual needs.

For example, according to at least one embodiment of the present disclosure, the Structural Similarity (SSIM) algorithm may be used to calculate similarity between two images. SSIM is a full-reference image quality evaluation index, measuring image similarity respectively from brightness, contrast, and structure. A formula for calculating SSIM is as follows:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}.$$

where, $\mu_x$ represents an average value of x, $\mu_y$ represents an average value of y, $\sigma_x^2$ represents a variance of x, $\sigma_y^2$ represents a variance of y, $\sigma_{xy}$ represents a covariance of x and y. $c_1=(k_1L)^2$, $c_2=(k_2L)^2$ represent constants for maintaining stability. L represents a dynamic range of pixel values. $k_1$=0.01, $k_2$=0.03. A value range of structural similarity is −1 to 1. The higher the value, the smaller the image distortion it indicates. When the two images are identical, the value of SSIM is equal to 1.

For example, according to at least one embodiment of the present disclosure, the "third threshold" may be set to 0.6, or may also be set to 0.8. It should be noted that the value of the "third threshold" will not be limited in the embodiment of the present disclosure, and may be set according to actual needs.

For example, according to at least one embodiment of the present disclosure, with respect to step S203 in FIG. 3, the determining whether to put the frame number of the first video frame into the first frame number set based on the comparison result, may include: determining to put the frame number of the first video frame into the first frame number set, in response to the comparison result indicating that the picture switch is present between the first video frame and the second video frame; and determining not to put the frame number of the first video frame into the first frame number set, in response to the comparison result indicating that no picture switch is present between the first video frame and the second video frame.

For example, in some examples, the target video includes video frame 1, video frame 2, video frame 3, video frame 4, video frame 5 . . . in time order. Through the video frame interpolation processing method 10 provided by the above-described embodiments, it is determined that the subtitle switch is present between the video frame 2 and the video frame 3, and the scene switch is present between the video frame 4 and the video frame 5. Therefore, the frame number "2" of the video frame 2 and the frame number "4" of the video frame 4 are put into the first frame number set.

For example, according to at least one embodiment of the present disclosure, duplicate frame numbers in the first frame number set may be deleted. For example, in some examples, through the video frame interpolation processing method 10 provided by the above-described embodiments, it is determined that there are both subtitle switch and scene switch between the video frame 2 and the video frame 3, so the first frame number set includes two identical frame numbers "2". In such a situation, duplicate frame numbers may be deleted, and only one frame number with the number "2" may be retained in the first frame number set.

Figure 5:
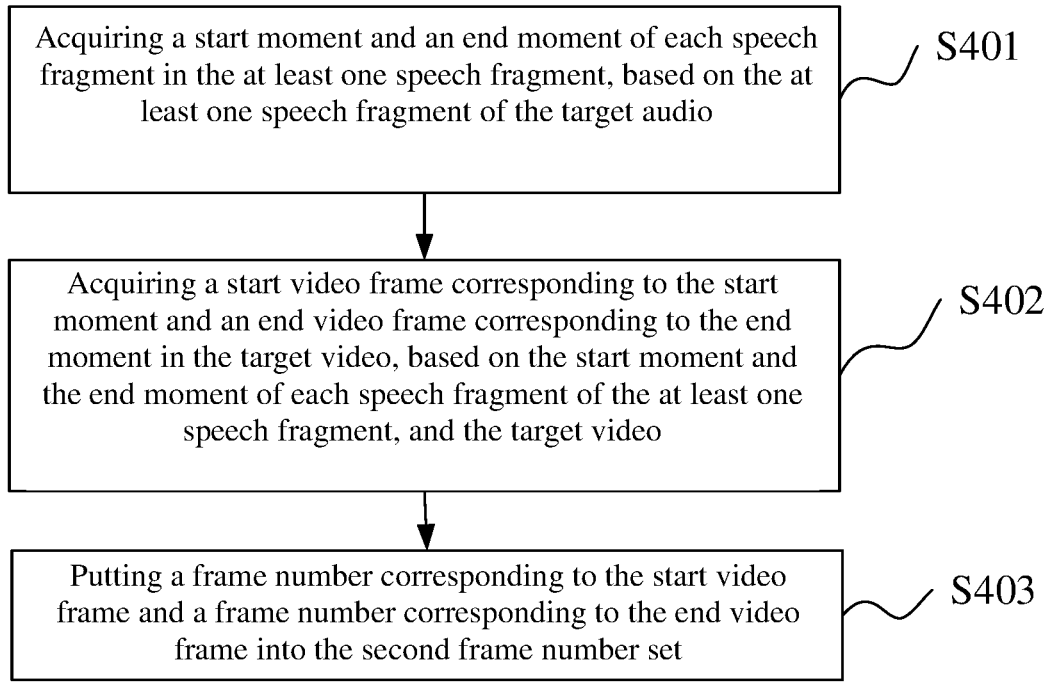
FIG. 5 is an operation flow chart corresponding to step S104 provided by at least one embodiment of the present disclosure.

FIG. 5 is an operation flow chart corresponding to step S104 provided by at least one embodiment of the present disclosure.

For example, according to at least one embodiment of the present disclosure, with respect to step S104 in FIG. 2, the acquiring a second frame number set, based on the at least one speech fragment of the target audio and the target video, may include steps S401 to S403 below, as shown in FIG. 5.

Step S401: acquiring a start moment and an end moment of each speech fragment in the at least one speech fragment, based on the at least one speech fragment of the target audio.

Step S402: acquiring a start video frame corresponding to the start moment and an end video frame corresponding to the end moment in the target video, based on a start moment and an end moment of each speech fragment of the at least one speech fragment, and the target video.

Step S403: putting a frame number corresponding to the start video frame and a frame number corresponding to the end video frame into the second frame number set.

It should be noted that according to the embodiment of the present disclosure, the "start video frame" and the "end video frame" are used to refer to two video frames determined based on time information of corresponding speech fragments; and the "start video frame" and the "end video frame" are neither limited to specific video frames, nor to a specific order.

For example, according to at least one embodiment of the present disclosure, with respect to step S401, the acquiring at least one speech fragment of the target audio, may include: acquiring the target audio, and performing speech recognition on the target audio, to obtain the at least one speech fragment of the target audio.

Figure 6:
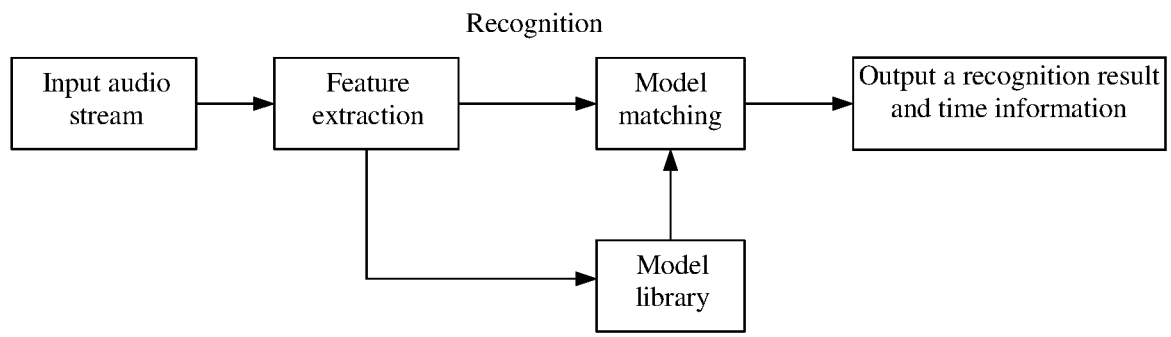
FIG. 6 is a schematic block diagram of a speech recognition process provided by at least one embodiment of the present disclosure.

FIG. 6 is a schematic block diagram of a speech recognition process provided by at least one embodiment of the present disclosure.

As shown in FIG. 6, speech features are extracted from the input audio data, and a template required for speech recognition is established on this basis. In the recognition process, the computer should compare a speech template stored in the computer with features of an input speech signal according to a model of speech recognition, and find out a series of optimal templates matching with the input audio according to certain search and matching strategies. Then, according to definition of the template, a recognition result of the computer may be given by looking up a table. For example, in some examples, an audio stream corresponding to the target video (i.e., the target audio) is input into a speech recognition system for speech segmentation, to obtain a speech recognition result and corresponding time information. For example, the time information includes the start moment and the end moment of the corresponding speech fragment.

It should be noted that the speech recognition algorithm will not be limited in the embodiments of the present disclosure, and any speech recognition algorithm may be adopted, as long as the target audio may be segmented into at least one speech fragment and corresponding time information may be obtained.

For example, according to at least one embodiment of the present disclosure, with respect to step S402, a start video frame and an end video frame corresponding to each speech fragment may be obtained, according to the speech fragment obtained by speech recognition and the corresponding time information (the start moment and the end moment), in combination with the target video.

For example, in some examples, the video frame sequence includes video frame 1, video frame 2, video frame 3, video frame 4, video frame 5 . . . in time order. It is assumed that a speech fragment obtained by speech recognition is "Where are you going", and according to time information of the speech fragment (e.g., a start moment and an end moment of the sentence), it is determined that corresponding to the speech fragment, a start video frame is video frame 1, and an end video frame is video frame 4. In such a situation, the frame number "1" of video frame 1 and the frame number "4" of video frame 4 are put into the second frame number set.

For example, according to at least one embodiment of the present disclosure, with respect to step S104, the acquiring a second frame number set, based on the at least one speech fragment of the target audio and the target video, may include: merging two adjacent second frame numbers in the second frame number set into one second frame number, wherein the one second frame number is a second frame number with a smaller value in the two adjacent second frame numbers.

For example, in one example, it is assumed that corresponding to one speech fragment obtained by speech recognition, a start video frame is video frame 1 and an end video frame is video frame 4; corresponding to another speech fragment obtained by speech recognition, a start video frame is video frame 5 and an end video frame is video frame 10; and corresponding to still another speech fragment obtained by speech recognition, a start video frame is video frame 11 and an end video frame is video frame 16. In such a situation, the frame numbers "1", "4", "5", "10", "11", and "16" are all put into the second frame number set. Then, two adjacent frame numbers in the second frame number set may be merged into one frame number. For example, the adjacent frame numbers "4" and "5" may be merged into one frame number "4", and the adjacent frame numbers "10" and "11" may be merged into one frame number "10". Then, the frame number with a largest value and the frame number with a smallest value in the second frame number set may be deleted. For example, in the above-described example, the frame numbers "1" and "16" may be deleted from the second frame number set to obtain a final second frame number set.

It should be noted that according to the embodiment of the present disclosure, the forward frame in the adjacent video frames is taken as reference, so the two adjacent frame numbers are merged into one frame number with a smaller value. If in the whole video frame interpolation processing method, the backward frame in the adjacent video frames is taken as reference, the two adjacent frame numbers may be merged into one frame number with a larger value, which will not be limited in the embodiments of the present disclosure, as long as it is kept consistent in the whole video frame interpolation processing method.

Figure 7:
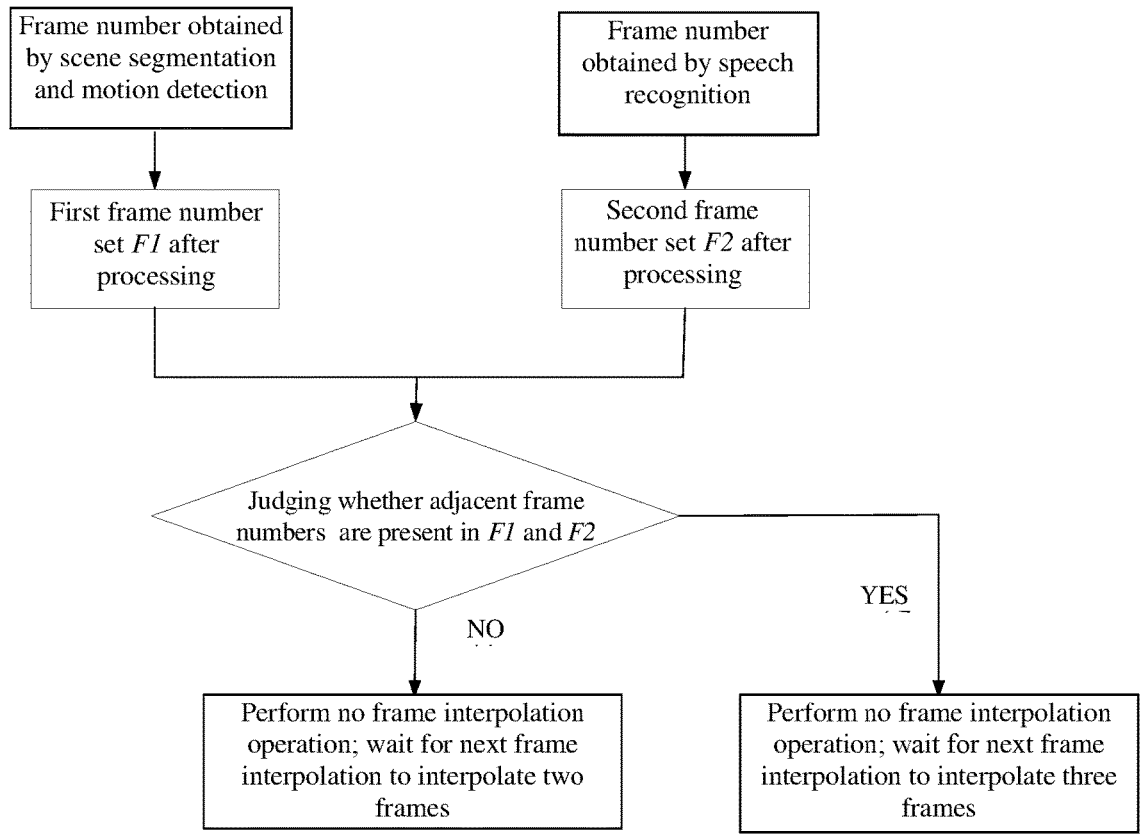
FIG. 7 is a schematic block diagram of another video frame interpolation processing method provided by at least one embodiment of the present disclosure.

FIG. 7 is a schematic block diagram of another video frame interpolation processing method provided by at least one embodiment of the present disclosure.

As shown in FIG. 7, the first frame number set F1 includes a frame number obtained by scene segmentation and motion detection, that is, a frame number of a video frame with picture switch. The second frame number set F2 includes a frame number obtained by speech recognition, that is, a frame number of a video frame with subtitle switch. The first frame number set F1 and the second frame number set F2 after processing may be obtained by using the video frame interpolation processing method 10 as described above, and no details will be repeated here. Next, step S105 in FIG. 2 is executed, and the frame interpolation operation is performed on the target video based on the first frame number set F1 and the second frame number set F2.

It should be noted that the embodiment of the present disclosure takes that the number of interpolated frames is based on frame interpolation of 2 times. For example, 30 fps (transmitted frames per second) is changed into 60 fps by frame interpolation, that is, the number of transmitted frames per second is increased from 30 to 60. When it is detected that scene switch or subtitle switch occurs between two adjacent video frames, no frame interpolation operation is executed between the current two frames; and in order to ensure the number of frames to be consistent, the next frame interpolation will have two frames interpolated. For another example, when scene switch and subtitle switch occur for two consecutive times, there will be two times of frame interpolation operation missing; and if the next frame interpolation still has only two frames interpolated, the whole video will have frames missing.

It should be noted that, in practical applications, there is rarely a problem that picture switch occurs in several consecutive adjacent video frames. Therefore, the embodiment of the present disclosure, takes that picture switch occurs consecutively at most twice, which will not be limited in the embodiments of the present disclosure, and may be set according to actual needs.

For example, according to at least one embodiment of the present disclosure, in order to avoid the case of frames missing, with respect to step S105, the performing frame interpolation on the target video, based on the first frame number set and the second frame number set, may include: performing no frame interpolation on the current video frame, in response to the frame number of the current video frame to undergo frame interpolation currently being in the first frame number set or the second frame number set; performing frame interpolation on the current video frame, in response to the frame number of the current video frame being not in the first frame number set or the second frame number set.

For example, according to at least one embodiment of the present disclosure, the performing frame interpolation on the current video frame, in response to the frame number of the current video frame being not in the first frame number set or the second frame number set, may include: interpolating one video frame for the current video frame (that is, inserting one video frame for the current video frame), in response to a frame number of a previous frame of the current video frame being not in the first frame number set or the second frame number set.

For example, according to at least one embodiment of the present disclosure, the performing frame interpolation on the current video frame, in response to the frame number of the current video frame being not in the first frame number set or the second frame number set, may include: interpolating two video frames for the current video frame (that is, inserting two video frames for the current video frame), in response to the frame number of the previous frame of the current video frame being in the first frame number set or the second frame number set, and the frame number of the previous frame has no adjacent frame numbers in the first frame number set or the second frame number set; interpolating three video frames for the current video frame (that is, inserting three video frames for the current video frame), in response to the frame number of the previous frame of the current video frame being in the first frame number set or the second frame number set, and the frame number of the previous frame has an adjacent frame number in the first frame number set or the second frame number set.

For example, in one example, the video frame sequence includes video frame 1, video frame 2, video frame 3, video frame 4, video frame 5 . . . and video frame 20 in time order; the first frame number set F1 includes frame numbers "5", "7" and "14"; and the second frame number set F2 includes frame numbers "8" and "16". For example, in one example, with respect to video frame 2 to undergo frame interpolation currently, because the frame number of the video frame 2 is not in the sets F1 and F2, and a frame number of a previous frame (video frame 1) of the video frame 2 is not in the sets F and F2, one video frame is interpolated for video frame 2, that is, one video frame is interpolated between the video frame 2 and the video frame 3. For example, in another example, with respect to video frame 5 to undergo frame interpolation currently, because the frame number of video frame 5 is in set F1, no frame interpolation is performed on video frame 5, that is, no frame interpolation is performed between the video frame 5 and the video frame 6. For another example, in another example, with respect to video frame 6 to undergo frame interpolation currently, because the frame number of the video frame 6 is not in the sets F1 and F2, frame interpolation may be performed on video frame 6, that is, frame interpolation may be performed between the video frame 6 and the video frame 7. Because a frame number of a previous frame (video frame 5) of the video frame 6 is in the set F1, and the frame number of the previous frame (video frame 5) has no adjacent frame numbers in the sets F1 and F2, two video frames may be interpolated for video frame 6, that is, two video frames may be interpolated between video frame 6 and video frame 7. For still another example, with respect to video frame 9 to undergo frame interpolation currently, because the frame number of video frame 9 is not in the sets F1 and F2, frame interpolation may be performed on video frame 9, that is, frame interpolation may be performed between the video frame 9 and the video frame 10. Because a frame number of a previous frame (video frame 8) of video frame 9 is in set F2, and the frame number of the previous frame (video frame 8) has an adjacent frame number (frame number "7") in the set F1, three video frames may be interpolated for video frame 9, that is, three video frames may be interpolated between the video frame 9 and the video frame 10, so as to ensure overall integrity of the video after frame interpolation.

For example, according to at least one embodiment of the present disclosure, the video frame interpolation processing method 10 may include: acquiring audio-and-video combination data. The audio-and-video combination data is used to acquire the target video and the target audio from the audio-and-video combination data. For example, the audio-and-video combination data is for the same object. For example, the audio-and-video combination data is for the same movie, the same MV, etc. It should be noted that sources of the target video and the target audio will not be limited in the embodiments of the present disclosure, and may be set according to actual needs.

Figure 8:
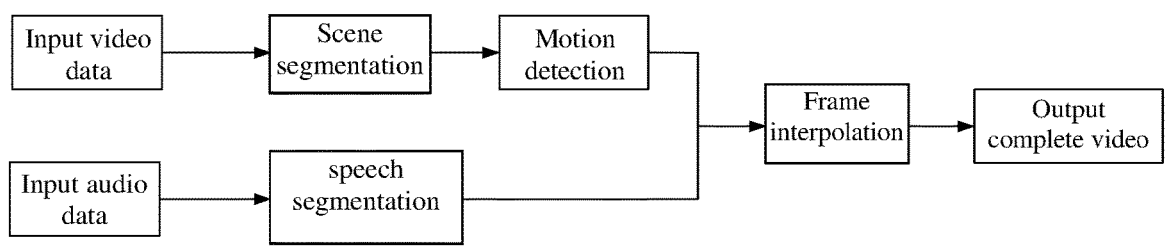
FIG. 8 is a schematic block diagram of another video frame interpolation processing method provided by at least one embodiment of the present disclosure.

FIG. 8 is a schematic block diagram of another video frame interpolation processing method provided by at least one embodiment of the present disclosure.

As shown in FIG. 8, in a video frame interpolation processing method provided by at least one embodiment of the present disclosure, receiving video data and audio data corresponding to the video data; performing scene segmentation and motion detection on the video data; performing speech segmentation on the audio data; and performing a frame interpolation operation on this basis, to obtain a complete video output. Operations in respective boxes shown in FIG. 8 are described in detail above, and no details will be repeated here.

Therefore, the video frame interpolation processing method 10 provided by at least one embodiment of the present disclosure may solve the problem of obvious deformation caused by video picture switch (subtitle switch, scene switch, etc.) during frame interpolation processing, and thus ensuring smoothness of the video and improving viewing experience of users.

It should also be noted that according to the respective embodiments of the present disclosure, an execution order of the respective steps of the video frame interpolation processing method 10 will not be limited; although the execution process of the respective steps is described in a specific order above, this does not constitute a limitation to the embodiments of the present disclosure. The respective steps in the video frame interpolation processing method 10 may be executed in serial or in parallel, which may be determined according to actual requirements. For example, the video frame interpolation processing method 10 may further include more or fewer steps, which will not be limited in the embodiments of the present disclosure.

At least one embodiment of the present disclosure further provides a video frame interpolation processing apparatus; the video frame interpolation processing apparatus may selectively execute frame interpolation processing, based on the first frame number set and the second frame number set, so as to effectively avoid the problem of obvious deformation caused by video picture switch during frame interpolation processing, ensure smoothness of the video, and thus improve viewing experience of users.

Figure 9:
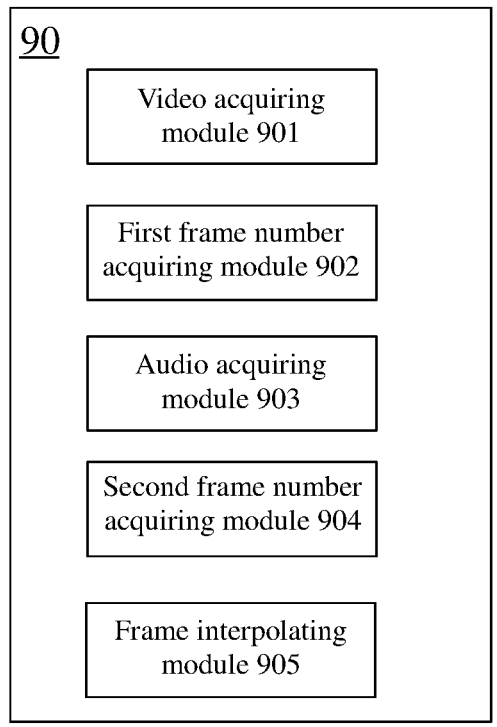
FIG. 9 is a schematic block diagram of a video frame interpolation processing apparatus provided by at least one embodiment of the present disclosure.

FIG. 9 is a schematic block diagram of a video frame interpolation processing apparatus provided by at least one embodiment of the present disclosure.

For example, according to at least one embodiment of the present disclosure, as shown in FIG. 9, the video frame interpolation processing apparatus 90 includes a video acquiring module 901, a first frame number acquiring module 902, an audio acquiring module 903, a second frame number acquiring module 904, and a frame interpolating module 905.

For example, according to at least one embodiment of the present disclosure, the video acquiring module 901 is configured to acquire a target video. The target video includes a plurality of video frames; each of the plurality of video frames has a corresponding frame number; and the frame numbers increase progressively in time order. For example, the video acquiring module 901 may implement step S101, the relevant description of step S101 may be referred to for a specific implementation method thereof, and no details will be repeated here.

For example, according to at least one embodiment of the present disclosure, the first frame number acquiring module 802 is configured to acquire a first frame number set based on the target video. The first frame number set includes at least one first frame number; and each of the at least one first frame number corresponds to a video frame in which picture switch exists. For example, the first frame number acquiring module 802 may implement step S102, the relevant description of step S102 may be referred to for a specific implementation method thereof, and no details will be repeated here.

For example, according to at least one embodiment of the present disclosure, the audio acquiring module 803 is configured to acquire at least one speech fragment of the target audio. The target audio corresponds to the target video in time domain. For example, the audio acquiring module 803 may implement step S103, the relevant description of step S103 may be referred to for a specific implementation method thereof, and no details will be repeated here.

For example, according to at least one embodiment of the present disclosure, the second frame number acquiring module 804 is configured to acquire a second frame number set, based on the at least one speech fragment of the target audio and the target video. The second frame number set includes at least one second frame number; and each of the at least one second frame number corresponds to a video frame in which subtitle switch exists. For example, the second frame number acquiring module 804 may implement step S104, the relevant description of step S104 may be referred to for a specific implementation method thereof, and no details will be repeated here.

For example, according to at least one embodiment of the present disclosure, the frame interpolating module 805 is configured to perform frame interpolation on the target video, based on the first frame number set and the second frame number set. For example, the frame interpolating module 805 may implement step S105, the relevant description of step S105 may be referred to for a specific implementation method thereof, and no details will be repeated here.

It should be noted that the video acquiring modules 901, the first frame number acquiring module 902, the audio acquiring module 903, the second frame number acquiring module 904 and the frame interpolating module 905 may be implemented through software, hardware, firmware, or any combination thereof, for example, the above-described modules may be respectively implemented as a video acquiring circuit 901, a first frame number acquiring circuit 902, an audio acquiring circuit 903, a second frame number acquiring circuit 904 and a frame interpolating circuit 905; and specific implementation modes thereof will not be limited in the embodiments of the present disclosure.

It should be understood that the video frame interpolation processing apparatus 90 provided by the embodiment of the present disclosure may implement the foregoing video frame interpolation processing method 10, can also achieve a technical effect similar to the foregoing video frame interpolation processing method 10, and no details will be repeated here.

It should be noted that according to the embodiment of the present disclosure, the video frame interpolation processing apparatus 90 may include more or fewer circuits or units, and connection relationships between the respective circuits or units will not be limited, which may be determined according to actual needs. Specific composition modes of the respective circuits will not be limited; and the respective circuits may be composed of analog devices, or may also be composed of digital chips, or may also be composed by other applicable modes according to the circuit principle.

Figure 10:
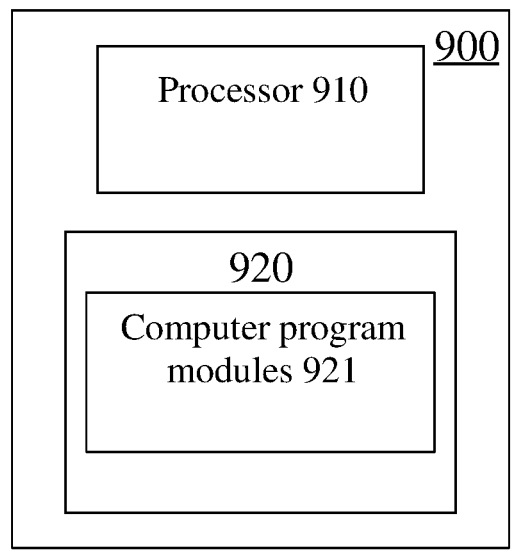
FIG. 10 is a schematic block diagram of another video frame interpolation processing apparatus provided by at least one embodiment of the present disclosure.

FIG. 10 is a schematic block diagram of another video frame interpolation processing apparatus provided by at least one embodiment of the present disclosure.

At least one embodiment of the present disclosure further provides a video frame interpolation processing apparatus 900. As shown in FIG. 10, the video frame interpolation processing apparatus 900 includes a processor 910 and a memory 920. The memory 920 includes one or more computer program modules 921. The one or more computer program modules 921 are stored in the memory 920 and configured to be executed by the processor 910; the one or more computer program modules 921 include instructions for executing the video frame interpolation processing method 10 provided by at least one embodiment of the present disclosure; wherein, the instructions, when executed by the processor 910, may execute one or more steps in the video frame interpolation processing method 10 provided by at least one embodiment of the present disclosure. The memory 920 and the processor 910 may be interconnected by a bus system and/or other form of connection mechanism (not shown).

For example, the processor 910 may be a Central Processing Unit (CPU), a Digital Signal Processor (DSP), or other forms of processing units having data processing capabilities and/or program execution capabilities, for example, a Field Programmable Gate Array (FPGA), etc.; for example, the Central Processing Unit (CPU) may be X86 or ARM architecture, etc. The processor 910 may be a general-purpose processor or a special-purpose processor, and may control other components in the video frame interpolation processing apparatus 900 to execute a desired function.

For example, the memory 920 may include any combination of one or more computer program products; and the computer program products may include various forms of computer-readable storage media, for example, a volatile memory and/or a non-volatile memory. The volatile memory may include, for example, a Random Access Memory (RAM) and/or a cache, or the like. The non-volatile memory may include, for example, a Read Only Memory (ROM), a hard disk, an Erasable Programmable Read Only Memory (EPROM), a portable Compact Disk Read Only Memory (CD-ROM), a USB memory, a flash memory, or the like. One or more computer program modules 921 may be stored on the computer-readable storage medium, and the processor 910 may run the one or more computer program modules 921, to implement various functions of the video frame interpolation processing apparatus 900. Various applications and various data, as well as various data used and/or generated by the applications may also be stored on the computer-readable storage medium. For specific functions and technical effects of the video frame interpolation processing apparatus 90, the above description of the video frame interpolation processing method 10 may be referred to, and no details will be repeated here.

Figure 11:
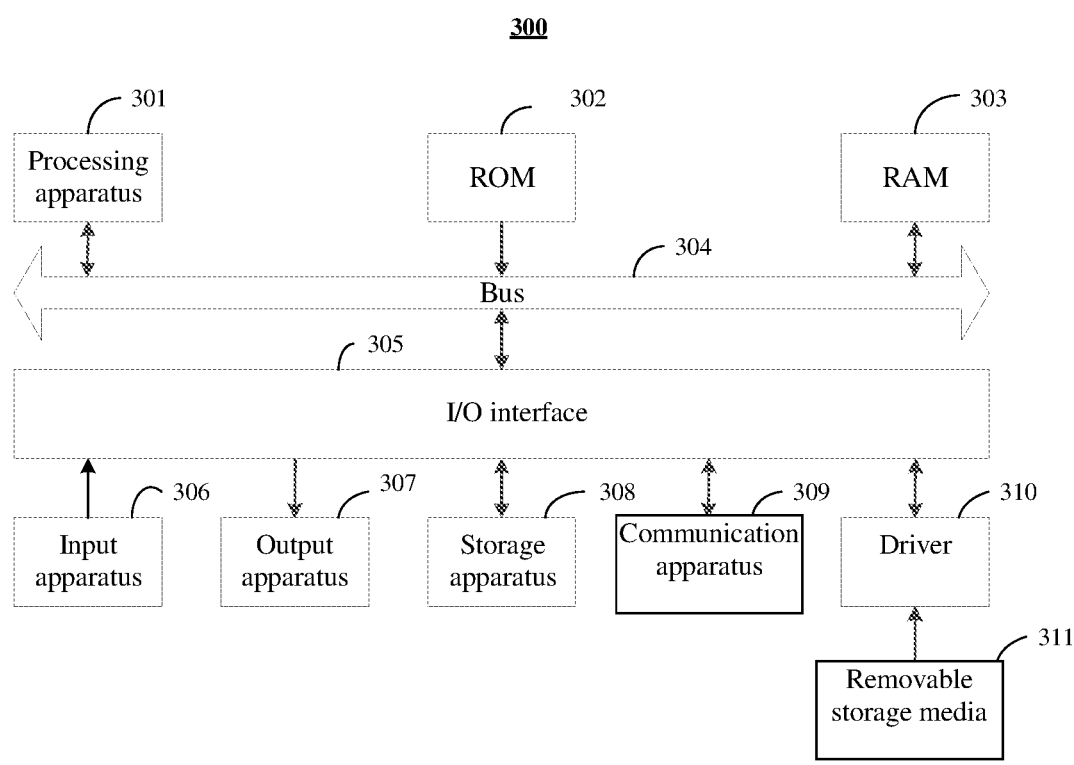
FIG. 11 is a schematic block diagram of still another video frame interpolation processing apparatus provided by at least one embodiment of the present disclosure.

FIG. 11 is a schematic block diagram of still another video frame interpolation processing apparatus 300 provided by at least one embodiment of the present disclosure.

The terminal device according to the embodiments of the present disclosure may include, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The video frame interpolation processing apparatus 300 shown in FIG. 11 is only an example, and should not impose any limitations on the functions and scope of use of the embodiments of the present disclosure.

For example, as shown in FIG. 11, in some examples, the video frame interpolation processing apparatus 300 may include a processing apparatus (e.g., a central processing unit, a graphics processor, etc.) 301, which may executes various appropriate actions and processing according to a program stored in a Read-Only Memory (ROM) 302 or a program loaded from a storage apparatus 308 into a Random Access Memory (RAM) 303. The RAM 303 further stores various programs and data required for operation of the computer system. The processing apparatus 301, the ROM 302, and the RAM 303 are connected with each other through a bus 304. An input/output (I/O) interface 305 is also coupled to the bus 304.

Usually, components below may be coupled to the I/O interface 305: input apparatuses 306 including, for example, a touch screen, a touch pad, a keyboard, a mouse, a camera, a microphone, an accelerometer, a gyroscope, etc.; output apparatuses 307 including, for example, a Liquid Crystal Display (LCD), a speaker, a vibrator, etc.; storage apparatuses 308 including, for example, a magnetic tape, a hard disk, etc.; and a communication apparatus 309 including, for example, a network interface card such as a LAN card, a modem, etc. The communication apparatus 309 may allow the video frame interpolation processing apparatus 300 to perform wireless or wired communication with other device so as to exchange data, and perform communication processing via a network such as the Internet. The driver 310 is also coupled to an I/O interface 305 as required. Removable storage media 311, such as a magnetic disk, an optical disk, a magneto-optical disk, a semiconductor memory, etc. are installed on the driver 310 as required, so that computer programs read therefrom may be installed into a storage apparatus 308 as required. Although FIG. 11 shows the video frame interpolation processing apparatus 300 including various apparatuses, it should be understood that, it is not required to implement or have all the apparatuses shown, and the video frame interpolation processing apparatus 300 may alternatively implement or have more or fewer apparatuses.

For example, the video frame interpolation processing apparatus 300 may further include a peripheral interface (not shown), etc. The peripheral interface may be interfaces of various types, for example, a USB interface, a lighting interface, etc. The communication apparatus 309 may communicate with a network and other devices through wireless communication, the network is, for example, the Internet, an intranet and/or a wireless network such as a cellular telephone network, a wireless Local Area Network (LAN) and/or a Metropolitan Area Network (MAN). Wireless communication may adopt any one of a variety of communication standards, protocols and technologies, including but not limited to Global System for Mobile communication (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (e.g., based on IEEE 802.11a, IEEE 802.11b, IEEE 802.11g and/or IEEE 802.11n standards), Voice over Internet Protocol (VOIP), Wi-MAX, protocols for e-mail, instant messaging and/or Short Message Service (SMS), or any other suitable communication protocol.

For example, the video frame interpolation processing apparatus 300 may be a mobile phone, a tablet personal computer, a laptop, an e-book, a game console, a television, a digital photo frame, a navigator, or any combination of data processing apparatuses and hardware, which will not be limited in the embodiments of the present disclosure.

For example, according to the embodiments of the present disclosure, the process described above with reference to a flow chart may be implemented as computer software programs. For example, the embodiments of the present disclosure include a computer program product, including a computer program carried on a non-temporary computer-readable medium, the computer program containing program codes for executing the method shown in the flow chart. In such embodiments, the computer program may be downloaded and installed from the network via the communication apparatus 309, or installed from the storage apparatus 308, or installed from the ROM 302. When executed by the processing apparatus 301, the computer program may execute the video frame interpolation processing method 10 disclosed in the embodiment of the present disclosure.

It should be noted that, the above-described computer-readable medium according to the present disclosure may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or Flash memory); an optical fiber, a portable Compact Disc Read-Only Memory (CD-ROM); an optical storage device; a magnetic storage device; or any suitable combination of the above. In the embodiments of the present disclosure, a computer-readable storage medium may be any tangible medium that contains or stores a program that may be used by or in conjunction with an instruction executing system, an apparatus, or a device. Rather, in the embodiments of the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a Radio Frequency (RF), etc., or any suitable combination of the above.

The above-described computer-readable medium may be included in the above-described video frame interpolation processing apparatus 300; or may also exist alone without being assembled into the video frame interpolation processing apparatus 300.

Figure 12:
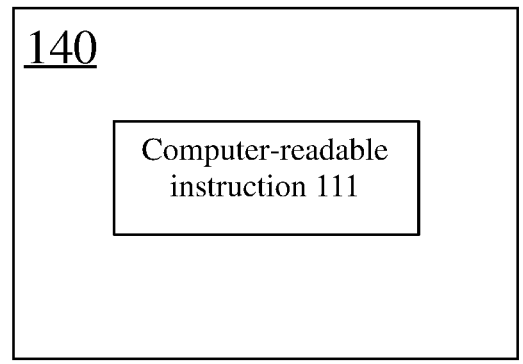
FIG. 12 is a schematic block diagram of a non-transitory readable storage medium provided by at least one embodiment of the present disclosure.

FIG. 12 is a schematic block diagram of a non-transitory readable storage medium provided by at least one embodiment of the present disclosure.

An embodiment of the present disclosure further provides a non-transitory readable storage medium. FIG. 12 is a schematic block diagram of a non-transitory readable storage medium provided by at least one embodiment of the present disclosure. As shown in FIG. 12, a computer instruction 111 is stored on the non-transitory readable storage medium 140; and when executed by the processor, the computer instruction 111 executes one or more steps in the video frame interpolation processing method 10 as described above.

For example, the non-transitory readable storage medium 140 may be any combination of one or more computer-readable storage media. For example, one computer-readable storage medium contains computer-readable program codes for acquiring a target video, another computer-readable storage medium contains computer-readable program codes for acquiring a first frame number set based on the target video, another computer-readable storage medium contains computer-readable program codes for acquiring at least one speech fragment of a target audio, another computer-readable storage medium contains computer-readable program codes for acquiring a second frame number set based on the at least one speech fragment of the target audio and the target video, and still another computer-readable storage medium contains computer-readable program codes for performing frame interpolation on the target video, based on the first frame number set and the second frame number set. Of course, the above-described respective program codes may also be stored in a same computer-readable medium, which will not be limited in the embodiments of the present disclosure.

For example, when the program codes are read by a computer, the computer may execute the program codes stored in the computer storage medium, for example, execute the video frame interpolation processing method 10 provided by any one embodiment of the present disclosure.

For example, the storage medium may include a memory card of a smart phone, a storage component of a tablet personal computer, a hard disk of a personal computer, a Random Access Memory (RAM), a Read-Only Memory (ROM), an Erasable Programmable Read-Only Memory (EPROM), a portable Compact Disc Read-Only Memory (CD-ROM), a flash memory, or any combination of the above-described storage media, or other applicable storage media. For example, the readable storage medium may also be the memory 920 in FIG. 10, the foregoing content may be referred to for the related description, and no details will be repeated here.

Figure 13:
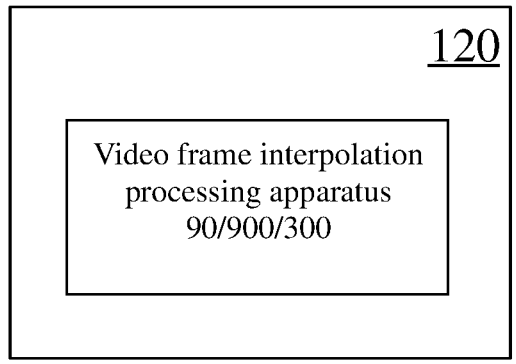
FIG. 13 is a schematic block diagram of an electronic device provided by at least one embodiment of the present disclosure.

An embodiment of the present disclosure further provides an electronic device. FIG. 13 is a schematic block diagram of an electronic device according to at least one embodiment of the present disclosure. As shown in FIG. 13, the electronic device 120 may include the video frame interpolation processing apparatus 90/900/300 as described above. For example, the electronic device 120 may implement the video frame interpolation processing method 10 provided by any one embodiment of the present disclosure.

In the present disclosure, the term "the plurality of" refers to two or more, unless otherwise explicitly defined.

Other embodiments of the disclosure will be readily apparent to those skilled in the art after considering the specification and practicing the disclosure disclosed herein. This disclosure is intended to cover any variations, uses or adaptations of this disclosure, which follow the general principles of this disclosure and include common sense or common technical means in this technical field that are not disclosed in this disclosure. The specification and examples are to be regarded as exemplary only, with a true scope and spirit of the disclosure indicated by the following claims.

It should be understood that the present disclosure is not limited to the precise structure that has been described above and shown in the drawings, and various modifications and changes can be made without departing from its scope. The scope of the present disclosure is limited only by the appended claims.

The invention claimed is:

1. A video frame interpolation processing method, comprising:
    acquiring a target video, wherein the target video comprises a plurality of video frames, each of the plurality of video frames has a corresponding frame number, and frame numbers of the plurality of video frames increase progressively in time order;
    acquiring a first frame number set, based on the target video, wherein the first frame number set comprises at least one first frame number, and each of the at least one first frame number corresponds to a video frame with picture switch;
    acquiring at least one speech fragment of a target audio, wherein the target audio corresponds to the target video in time domain;
    acquiring a second frame number set, based on the at least one speech fragment of the target audio and the target video, wherein the second frame number set comprises at least one second frame number, and each of the at least one second frame number corresponds to a video frame with subtitle switch; and
    performing frame interpolation on the target video, based on the first frame number set and the second frame number set.

2. The method according to claim 1, wherein the picture switch comprises the subtitle switch and/or scene switch.

3. The method according to claim 2, wherein the acquiring a first frame number set based on the target video, comprises:
    acquiring a first video frame and a second video frame of the target video, wherein the first video frame and the second video frame are adjacent in time domain, and the first video frame is a forward frame of the second video frame;
    acquiring a comparison result between the first video frame and the second video frame, based on the first video frame and the second video frame, wherein the comparison result indicates whether the picture switch is present between the first video frame and the second video frame; and
    determining whether to put a frame number of the first video frame into the first frame number set based on the comparison result.

4. The method according to claim 3, wherein the acquiring a comparison result between the first video frame and the second video frame based on the first video frame and the second video frame, comprises:
    determining whether the subtitle switch is present between the first video frame and the second video frame, based on whether a subtitle image of the first video frame and a subtitle image of the second video frame are identical.

5. The method according to claim 4, wherein the determining whether the subtitle switch is present between the first video frame and the second video frame based on whether a subtitle image of the first video frame and a subtitle image of the second video frame are identical, comprises:
    acquiring a first sub-image of the first video frame, wherein the first sub-image corresponds to a subtitle region of the first video frame;
    acquiring a second sub-image of the second video frame, wherein the second sub-image corresponds to a subtitle region of the second video frame; and
    determining whether the subtitle switch is present between the first video frame and the second video frame, based on the first sub-image and the second sub-image.

6. The method according to claim 5, wherein the determining whether the subtitle switch is present between the first video frame and the second video frame, based on the first sub-image and the second sub-image, comprises:
    performing subtraction between the first sub-image and the second sub-image to obtain a binary image;
    determining that the subtitle switch is present between the first video frame and the second video frame, in response to a count of first pixels in the binary image being greater than a first threshold, wherein a value of a first pixel is greater than a second threshold; and
    determining that the subtitle switch is not present between the first video frame and the second video frame, in response to the count of the first pixels being not greater than the first threshold.

7. The method according to claim 3, wherein the acquiring a comparison result between the first video frame and the second video frame, based on the first video frame and the second video frame, comprises:
    determining whether the scene switch is present between the first video frame and the second video frame, based on whether a scene of the first video frame and a scene of the second video frame are identical.

8. The method according to claim 7, wherein the determining whether the scene switch is present between the first video frame and the second video frame, based on whether a scene of the first video frame and a scene of the second video frame are identical, comprises:

acquiring a similarity between the first video frame and the second video frame;

determining that the scene switch is not present between the first video frame and the second video frame, in response to the similarity being greater than a third threshold; and determining that the scene switch is present between the first video frame and the second video frame, in response to the similarity being not greater than the third threshold.

9. The method according to claim 3, wherein the determining whether to put a frame number of the first video frame into the first frame number set based on the comparison result, comprises:

determining to put the frame number of the first video frame into the first frame number set, in response to the comparison result indicating that the picture switch is present between the first video frame and the second video frame; and determining not to put the frame number of the first video frame into the first frame number set, in response to the comparison result indicating that the picture switch is not present between the first video frame and the second video frame.

10. The method according to claim 1, wherein the acquiring a first frame number set based on the target video, comprises:

deleting duplicate first frame numbers in the first frame number set.

11. The method according to claim 1, wherein the acquiring a second frame number set, based on the at least one speech fragment of the target audio and the target video, comprises:

acquiring a start moment and an end moment of each speech fragment in the at least one speech fragment, based on the at least one speech fragment of the target audio;

acquiring a start video frame corresponding to the start moment and an end video frame corresponding to the end moment in the target video, based on the start moment and the end moment of each speech fragment in the at least one speech fragment, and the target video; and putting a frame number corresponding to the start video frame and a frame number corresponding to the end video frame into the second frame number set.

12. The method according to claim 1, wherein the acquiring a second frame number set, based on the at least one speech fragment of the target audio and the target video, comprises:

merging two adjacent second frame numbers in the second frame number set into one second frame number, wherein the one second frame number is a second frame number with a smaller value in the two adjacent second frame numbers.

13. The method according to claim 1, wherein the acquiring at least one speech fragment of a target audio, comprises:

acquiring the target audio; and performing speech recognition on the target audio, to obtain the at least one speech fragment of the target audio.

14. The method according to claim 1, wherein the performing frame interpolation on the target video, based on the first frame number set and the second frame number set, comprises:

performing no frame interpolation on a current video frame, in response to a frame number of the current video frame to undergo frame interpolation currently being in the first frame number set or the second frame number set; and performing frame interpolation on the current video frame, in response to the frame number of the current video frame being not in the first frame number set or the second frame number set.

15. The method according to claim 14, wherein the performing frame interpolation on the current video frame, in response to the frame number of the current video frame being not in the first frame number set or the second frame number set, comprises:

interpolating one video frame for the current video frame, in response to a frame number of a previous frame of the current video frame being not in the first frame number set or the second frame number set.

16. The method according to claim 14, wherein the performing frame interpolation on the current video frame, in response to the frame number of the current video frame being not in the first frame number set or the second frame number set, comprises:

interpolating two video frames for the current video frame, in response to a frame number of a previous frame of the current video frame being in the first frame number set or the second frame number set, and the frame number of the previous frame has no adjacent frame number in the first frame number set or the second frame number set; and interpolating three video frames for the current video frame, in response to the frame number of the previous frame of the current video frame being in the first frame number set or the second frame number set, and the frame number of the previous frame has an adjacent frame number in the first frame number set or the second frame number set.

17. The method according to claim 1, further comprising:

acquiring audio-and-video combination data, wherein the audio-and-video combination data is used to acquire the target video and the target audio from the audio-and-video combination data.

18. A video frame interpolation processing apparatus, comprising:

a video acquiring module, configured to acquire a target video, wherein the target video comprises a plurality of video frames, each of the plurality of video frames has a corresponding frame number, and frame numbers of the plurality of video frames increase progressively in time order;

a first frame number acquiring module, configured to acquire a first frame number set based on the target video, wherein the first frame number set comprises at least one first frame number, and each of the at least one first frame number corresponds to a video frame with picture switch;

an audio acquiring module, configured to acquire at least one speech fragment of the target audio, wherein the target audio corresponds to the target video in time domain;

a second frame number acquiring module, configured to acquire a second frame number set, based on the at least one speech fragment of the target audio and the target video, wherein the second frame number set comprises at least one second frame number, and each of the at least one second frame number corresponds to a video frame with subtitle switch; and a frame interpolating module, configured to perform frame interpolation on the target video, based on the first frame number set and the second frame number set.

19. A video frame interpolation processing apparatus, comprising:
a processor;
a memory, comprising one or more computer program modules;
wherein the one or more computer program modules are stored in the memory and configured to be executed by the processor, and the one or more computer program modules comprise instructions for executing a video frame interpolation processing method,
wherein the video frame interpolation processing method comprises:
acquiring a target video, wherein the target video comprises a plurality of video frames, each of the plurality of video frames has a corresponding frame number, and frame numbers of the plurality of video frames increase progressively in time order;
acquiring a first frame number set, based on the target video, wherein the first frame number set comprises at least one first frame number, and each of the at least one first frame number corresponds to a video frame with picture switch;
acquiring at least one speech fragment of a target audio, wherein the target audio corresponds to the target video in time domain;
acquiring a second frame number set, based on the at least one speech fragment of the target audio and the target video, wherein the second frame number set comprises at least one second frame number, and each of the at least one second frame number corresponds to a video frame with subtitle switch; and
performing frame interpolation on the target video, based on the first frame number set and the second frame number set.

20. A non-transitory readable storage medium, having computer instructions stored thereon, wherein when executed by a processor, the computer instructions execute the video frame interpolation processing method according to claim 1.

* * * * *